United States Patent [19]

Spranger

[11] Patent Number: 4,913,670
[45] Date of Patent: Apr. 3, 1990

[54] BLADE-LIKE PROFILED DEVICE FOR ACTING ON A GASEOUS OR LIQUID FLUID FLOW

[76] Inventor: Guenter Spranger, Wagnerstrasse 2, DE-2000 Hamburg 76, Fed. Rep. of Germany

[21] Appl. No.: 168,044

[22] Filed: Mar. 14, 1988

[30] Foreign Application Priority Data

Mar. 13, 1987 [DE] Fed. Rep. of Germany ....... 3708159
Dec. 31, 1987 [DE] Fed. Rep. of Germany ....... 3744582

[51] Int. Cl.$^4$ .............................................. B63H 1/14
[52] U.S. Cl. ...................................... 440/49; 416/231 B
[58] Field of Search ..................... 416/90 R, 90 A, 91, 416/175, 223 R, 223 B, 227 R, 227 A, 228, 229, 231 R, 231 B, 247 R, 247 A, 244 B; 114/133, 134; 440/49

[56] References Cited

U.S. PATENT DOCUMENTS

| | | | |
|---|---|---|---|
| 1,553,627 | 9/1925 | Nagler | 416/231 B |
| 3,075,743 | 1/1963 | Sheets | 416/231 B |
| 4,636,143 | 1/1987 | Zeides | 416/231 B |
| 4,687,416 | 8/1987 | Spranger | 416/223 |

FOREIGN PATENT DOCUMENTS

| | | | |
|---|---|---|---|
| 832830 | 10/1938 | France | 416/231 B |
| 53218 | 5/1967 | Poland | 416/231 B |

*Primary Examiner*—Joseph F. Peters, Jr.
*Assistant Examiner*—Jesus D. Sotelo
*Attorney, Agent, or Firm*—Sixbey, Friedman, Leedom & Ferguson

[57] ABSTRACT

The invention relates to a profiled device configured as a slotted blade head to improve the efficiency in blade-like structural elements that have a gas or a fluid flowing around them such as foils, vanes of jet engines, propellers, keels of ships or the like. The blade head is formed of a group of profiled blade elements (3) having a laminar profile with radially running slots formed between the blade elements at a distance from the base of the blade head. End edges (4) of the blade elements (3) that are consecutive in an initial flow direction (X) are offset relative to each other each in the direction of a pressure zone (6). Slots (2) between the blade edges (4) are of a nozzle-shaped configuration with a flow direction extending from the pressure zone (6) to the underpressure zone (5). The blade elements (3) are located within a profile envelope (73) set by the blade base of the group of blade elements.

36 Claims, 12 Drawing Sheets

BLADE-LIKE PROFILED DEVICE FOR ACTING ON A GASEOUS OR LIQUID FLUID FLOW

BACKGROUND AND SUMMARY OF THE INVENTION

The invention relates to a blade-like profiled device that has a gas or a fluid flowing around it and exhibits, to improve the efficiency, blades with a lamellar profile between which, to shift the flow separation zone, in each case, a slot is placed that extends to a maximum width to the edge of the lamellar blade.

Such a device is known from DE-PS 3,105,183 and corresponding U.S. Pat. No. 4,687,416. But this device has the drawback that at considerable total lengths of the lamellar blades, the blades can oscillate due to their elasticity, which can impair the flow of the fluid or gas. Thus, to avoid these drawbacks, extraordinarily high quality materials are necessary, due to which the production costs of this known device are greatly increased. Further, it has been shown that, with this known device, the flow losses are certainly decreased by reducing the influence of flow vortices, but the increase of the efficiency and thus of the energy utilization is still limited.

The object of the invention is to improve the device of the type mentioned above so that, with simplified production, the efficiency is optimized and a general purpose application in parts that have fluids or gases flowing around them is achieved.

According to the invention, the object is achieved in that the blade-like device has a blade structure having slots running radially outwardly from a location that is at a distance from the root of the blade structure so as to form a spreading blade, as a slotted blade formed of a group of profiled blade elements having a laminar profile, and the blade elements of the slotted blade are placed relative to each other so that the blade edges of the blade elements, that are consecutive in the initial flow direction are configured offset relative to each other each in the direction of the pressure zone of the slotted blade profile. According to the invention, this device can be applied universally to parts that have gaseous or liquid fluids fluids around them, and thus are particularly suitable to the formation of foils, propeller blades of screw propellers and helicopter rotors, blades of ship hulls and keels, etc.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIGS. 17a–c show where

DETAILED DESCRIPTION OF THE PREFERRED EMBODIMENTS

Figure 1:
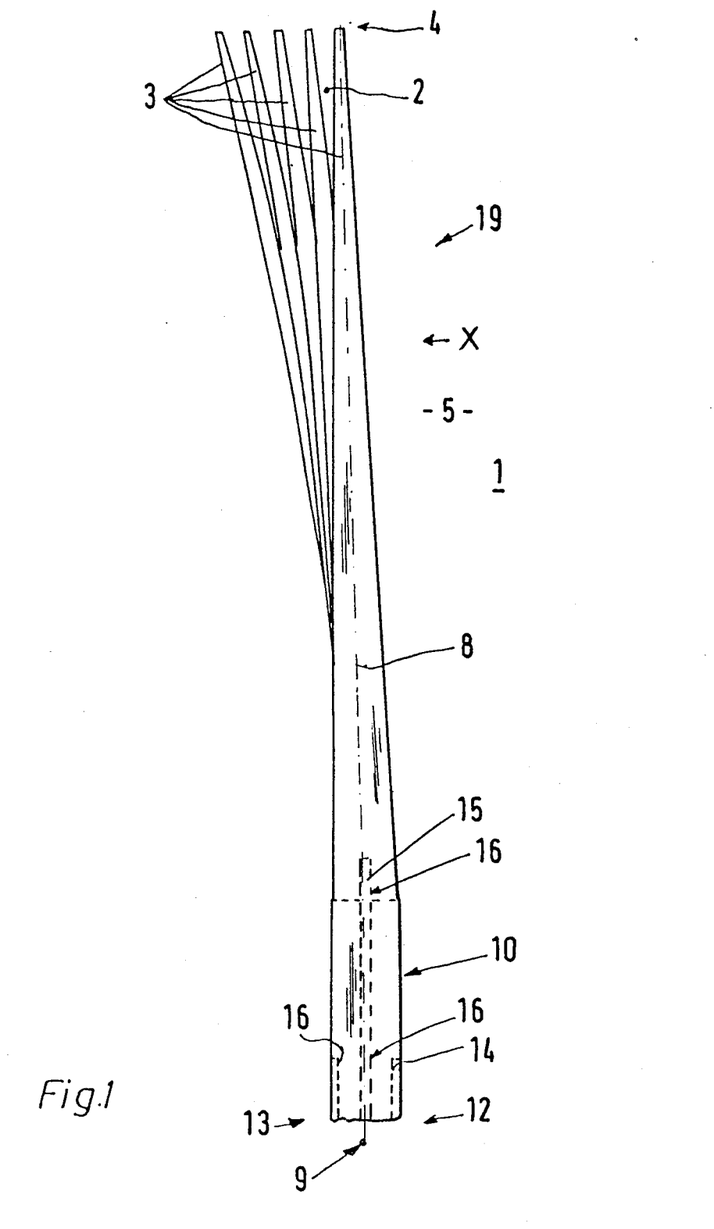
FIG. 1 shows an embodiment of a spreading blade according to the invention in a front view.

As shown in FIG. 1, the device to improve the efficiency of blade-like structural elements consists of a specially configured blade head 1 which is formed either as one piece on a whole blade 9 or can be connected to a blade body 12 to form a whole blade 9. Blade elements 3, separated by slots 2, create a slotted spreading blade and are placed on blade head 1 by being connected to a blade base 10. The slotted blades are configured so that blade edges 4 of blade elements 3, which are consecutive in initial flow direction X, are each offset relative to each other in the direction of pressure zone 6 of the slotted blade profile. Here, chords 7 of the individual blade elements 3 can be placed generally parallel to each other. However, it is more advantageous to provide a differentiated incline for the individual blade elements 3 of the slotted blade, and it is desirable for the offset between chord lines 7 of adjacent blade elements 3 to increase with decreasing distance to the edges 4. Further, blade elements 3 which follow first slotted blade elements 3 in initial flow direction X are, relative to the respective longitudinal axis 8 of whole blade 9, convexly curved in such a way that the radially oriented flow of the liquid or gas is deflected on the trailing side in a flow that is oriented generally at a right angle to the radial flow. It is advantageous to place blade elements 3 extending somewhat beyond the area of the outer third of the length of whole blade 9. Here, the flow-through area of slots 2, between blade elements 3, is configured so that it widens radially outwardly to a maximum at each blade edge 4.

It is possible to orient the blade element 3 that is in front in initial flow direction X generally coaxially to longitudinal axis 8 of whole blade 9 and to configure subsequent blade elements 3 to protrude into pressure zone 6. In certain operating conditions, the blade element or blade elements 3 that are in front in initial flow direction X can protrude, in the plane of longitudinal axis 8 of whole blade 9, in initial flow direction X. In this case, at least a middle blade element 3 is oriented generally coaxially to longitudinal axis 8 of whole blade 9, while the blade element 3 that follows in the trailing direction protrudes into pressure zone 6. Preferably, blade elements 3 are configured with a laminar profile to achieve optimal flow conditions. It is possible to design slots 2 to be nozzle-shaped between the blade elements 3.

Figure 2:
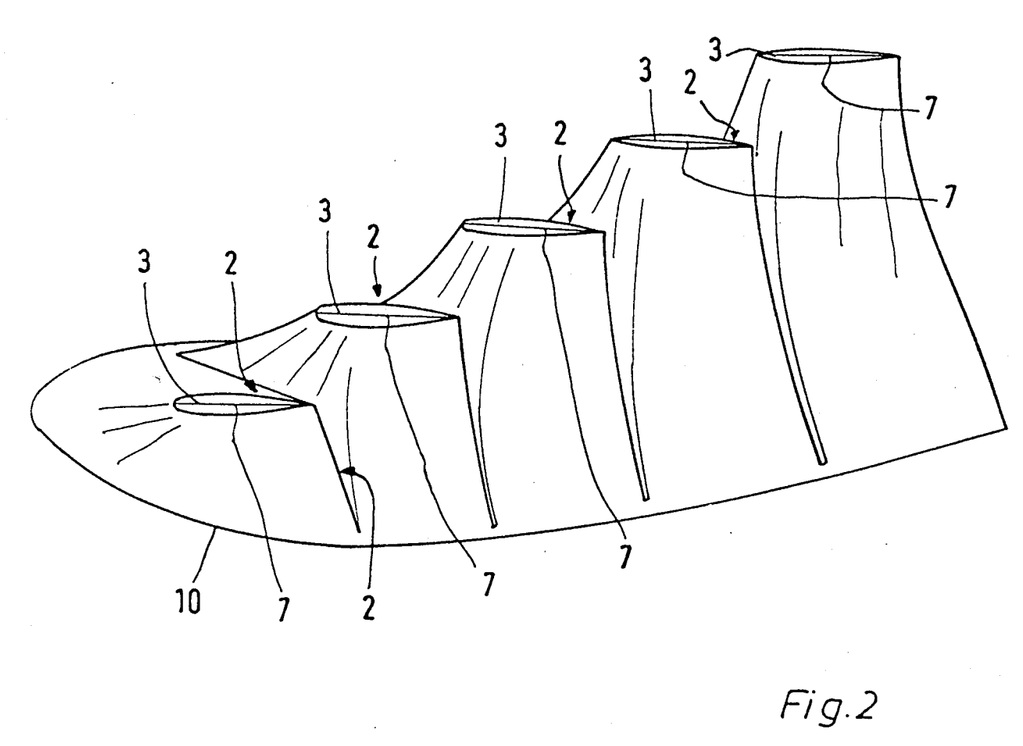
FIG. 2 shows the blade base of the spreading blade according to FIG. 1 in a diagrammatically perspective view.

As indicated in FIG. 2, blade elements 3 are connected to blade base 10 and are integrated into its profile. The blade head 1 formed by the slotted blade, comprised of blade elements 3 and blade base 10, can be configured of a one piece structure formed of a high alloy or high temperature-resistant metal. Such blade heads 1 are suitable, particularly for gas turbine engines, in which the blade base 10 is fastened to the armature of the rotor. Coolant channels can also be provided, in blade base 10 and in blade elements 3, in order to be able to cool blade heads 1 with a coolant. It is also possible, for other turboengines, to configure blade elements 3 and blade base 10 as a one-piece structure formed of a high temperature-resistant ceramic material.

Especially for use in wind-driven rotors, blade elements 3 and blade base 10 can be formed of a plastic, wood or metal and each blade element 3 can be connected by an adhesive 16 to blade base 10. A slotted blade, blade head 1 configured this way can be connected by a coupling or the like to a blade body 12 to form a complete blade 9.

Figure 3:
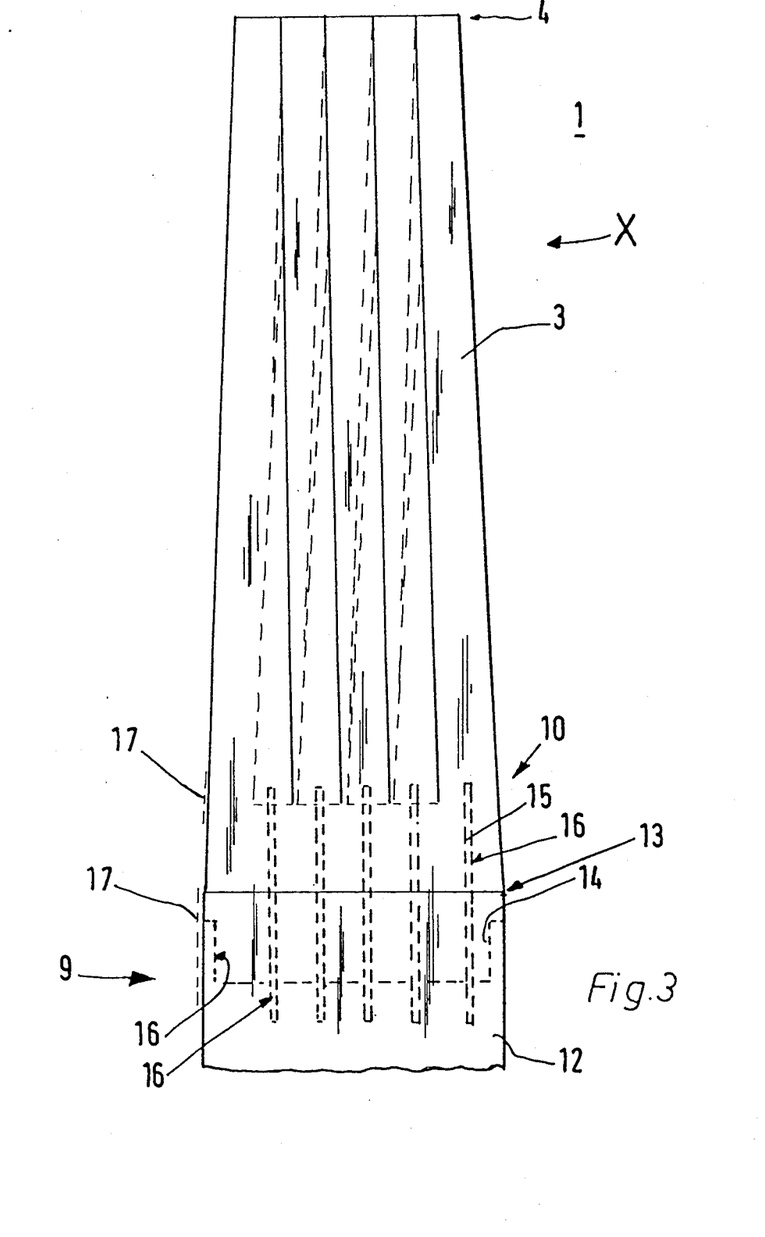
FIG. 3 the spreading blade according to FIG. 1 in a side view.

FIG. 3 shows a special configuration of a coupling. On outer end section 13 of blade body 12, a recess 14 is formed into which the lower section of blade head 1 is pushed and connected by an adhesive 16 to blade body 12. On each blade element 3, a pin 15 is formed which is guided through blade base 10 and inserted into blade body 12. Each pin 15 is connected to blade head 1 and blade body 12 likewise by, for example, adhesives 16. In the region of the connecting sections of blade elements 3 and blade base 10, and of blade head 1 and blade body 12, a laminate layer 17, made of plastic or the like, is applied whose outer surface is matched to the combined profile of blade elements 3, blade base 10 and blade body 12. To increase the strength of laminate layer 17, it may be fiber-reinforced.

A coupling for blade head 1 configured as described, makes it possible to improve the performance of wind-driven rotors that already exist by retrofitting the blade head to the parts that are in use. For this, it is required only to shorten the blades on hand to a blade body 12 and to then place on its end section, in each case, a blade head 1 of the type described above.

Figures 4A, 4B:
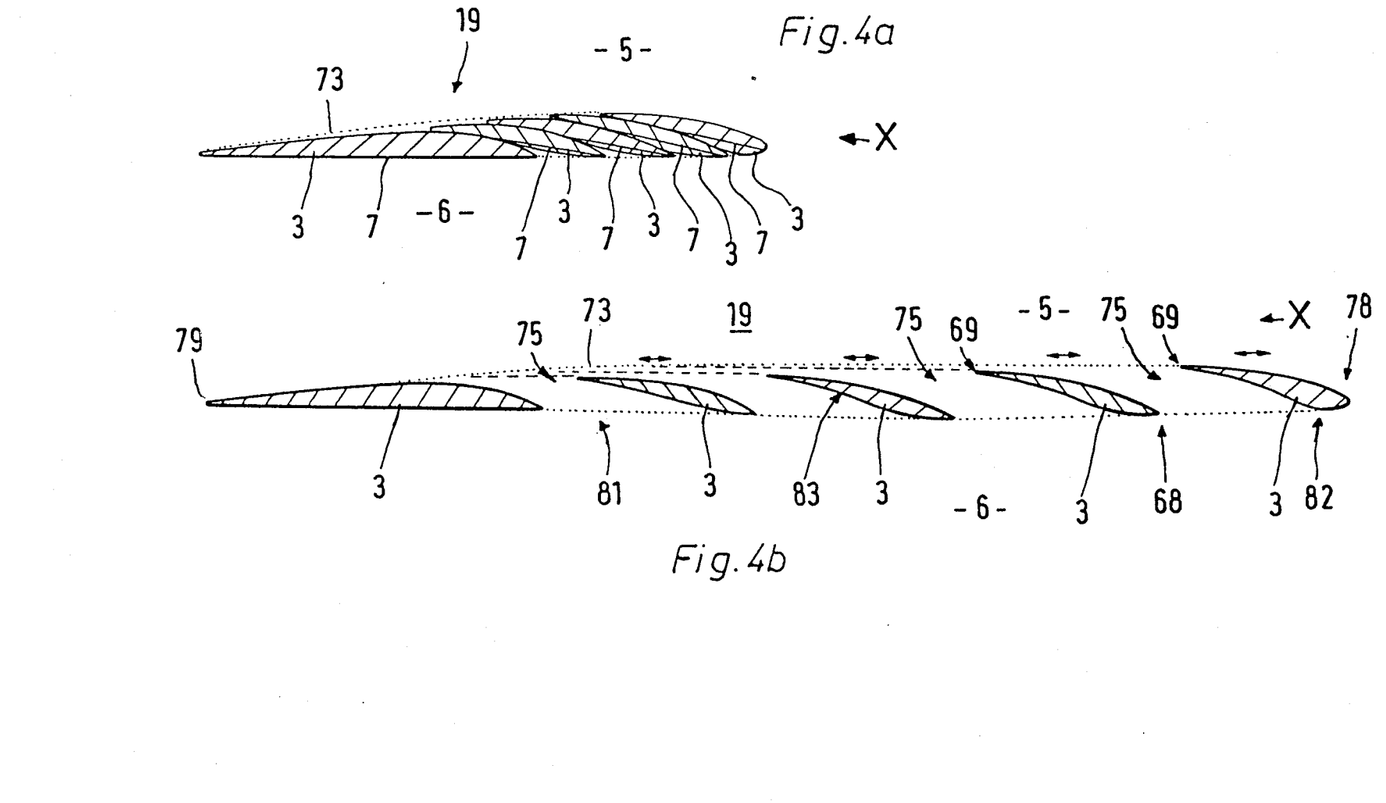
FIG. 4a shows a further embodiment of a spreading blade in a crosswise sectional view in an adjacently positioned blade element slotted blade configuration.
FIG. 4b shows the spreading blade according to FIG. 4a with the blade elements of the slotted blade pivoted apart, also in a crosswise sectional view.

It is also possible to design a spreading blade 19 wherein the slotted blade is made up of blade elements 3 that can be pivoted in the radial plane from an adjacent position (FIG. 4a) to a separated spread position (FIG. 4b). In this case, actuators that can act electrically or hydraulically are provided in blade base 10 for the shifting of blade elements 3. Thus, it is possible, for example, to connect each blade element 3 to an electric servomotor that has a greatly reducing set of gears. The actuators can be in operative connection with an electronic control device so that either all of the blade elements 3 together or only certain selected blade elements 3 are pivoted. It is also possible to configure at least one of the blade elements 3 to be pivotable around its longitudinal axis. This can deliberately effect an interruption of the flow around spreading blade 19 if the respective operating conditions require it.

As detailed in FIG. 4a, with corresponding profiling of blade elements 3, after pivoted toward each other, a high efficiency profile is generated that is particularly suitable for higher velocities of flow from the initial direction X. With small velocities of flow from the initial direction X, five-part slotted spreading blade 19 is spread fanwise into a position as illustrated, for example, in FIG. 4b. Slotted blades 3 are always located within a profile envelope 73 determined by the configuration of spreading slotted blade 19 (FIGS. 4a and 4b). In the region of end section 75 of the slots 2 on the underpressure side, trailing edges 69 of slotted blades 3 are configured sharp-edged. By this spreading of blade elements 3, a considerable improvement in the ascending force is achieved without a noticeable increase of the induced resistance. While retaining the profile geometry of a laminar profile, the shear flow influences the vortex train so that the wake is shortened and the efficiency is decisively improved. With the possibility of controlling blade elements 3 individually, maximum exploitation of the respective energy conversion is assured.

Figure 5:
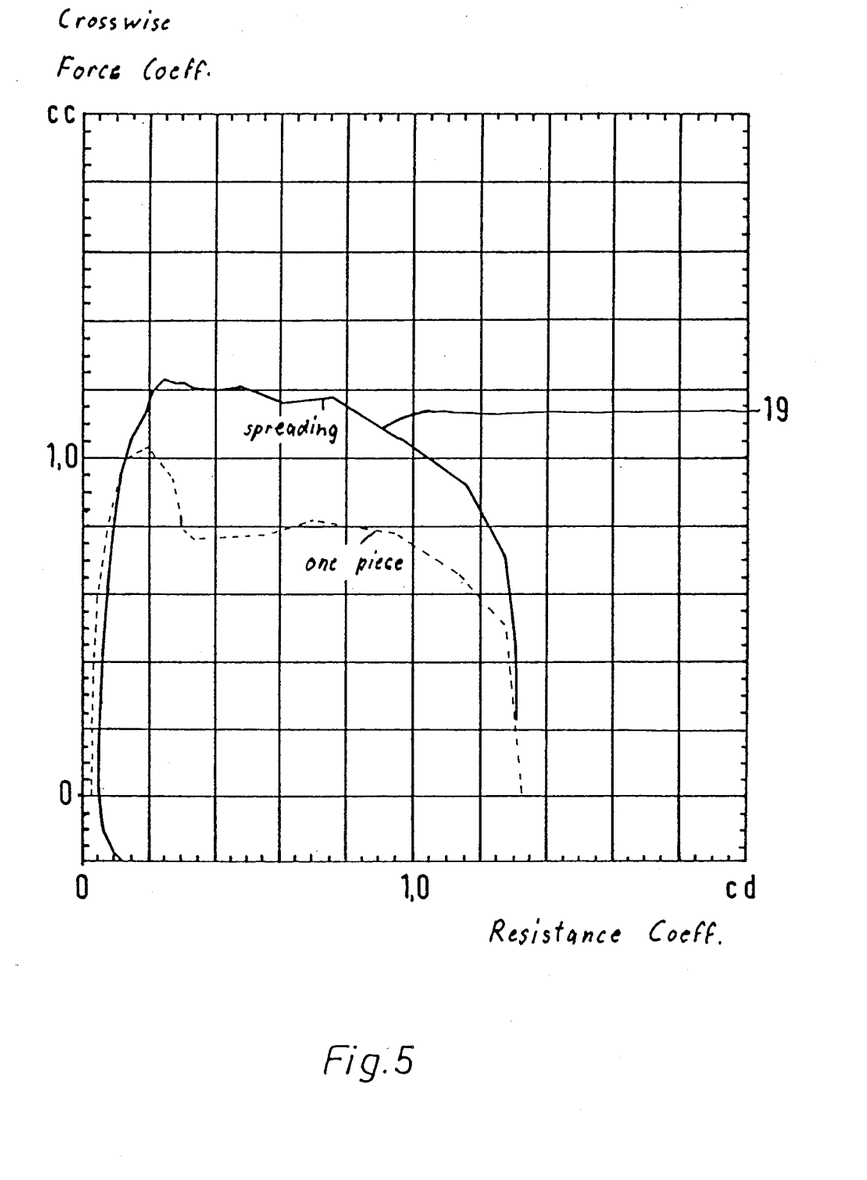
FIG. 5 is a diagram of comparative measurements of a normal blade profile and a spreading blade.

The diagram according to FIG. 5 illustrates the advantages of the slotted spreading blade 19. This diagram shows a test result in which, with equal velocities of flow from the initial direction, a one-piece base profile and a slotted spreading blade 19, made of five blade elements 3 were measured. The profile envelope 73 of spreading blade 19 corresponds to that of the one-piece base profile. It can clearly be seen that with equal resistance coefficients cd the crosswise force coefficients cc of spreading blade 19 are higher than in the one-piece base profile.

Figure 6:
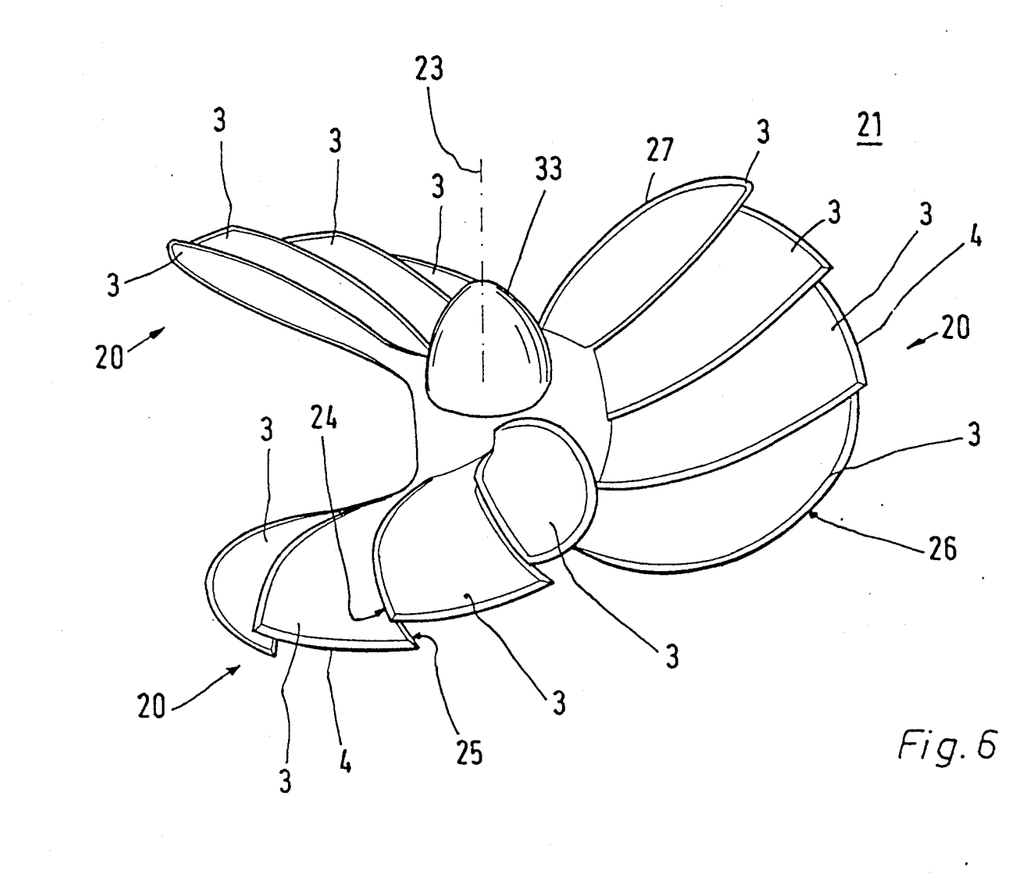
FIG. 6 shows a screw propeller embodiment in a perspective view.

FIG. 6 shows a propeller 21 that exhibits three propeller blades 20. Each propeller blade 20 is configured as a slotted blade comprised of four blade elements 3. These blade elements 3 are profiled. To form them, three radially extending slots 2 are placed in each propeller blade 20 and run convexly. Slots 2 extend from about propeller hub 33 to blade edge 4. The profiling of blade elements 3 is such that individual blade elements 3 of each propeller blade 20 that follow consecutively in the rotation direction are configured to be offset relative to blade edge 4 and to each other in the trailing direction.

Front blade elements 3 are generally oriented radially to propeller hub 33. Middle blade elements 3 and rear blade elements 3 protrude into the pressure zone. Here, blade elements 3 are each designed offset to each other. Front blade elements 3 are placed in a radially normal plane that is oriented toward the pressure zone at an oblique angle to longitudinal axis 23 of the propeller.

The surfaces of blade elements 3 around which fluid flows are approximately equal. Middle blade elements 3 extend generally radially to propeller hub 33 while front blade element 3 is curved forward relative to middle blade elements 3, and rear blade element 3 is curved backward relative to middle blade elements 3.

Slot edges 24, 25 of the adjacent side edges of blade elements 3 can be scarfed at an oblique angle to the propeller plane but are generally parallel to each other. This reinforces the profile curvature of individual blade elements 3.

Edge sides 26, 27 on the leading and trailing sides of blade 20 can, likewise, be scarfed at an oblique angle to the propeller plane. It is especially advantageous to configure slots 2 to be nozzle-shaped and to provide blade elements 3 with a laminar profile.

Figure 7:
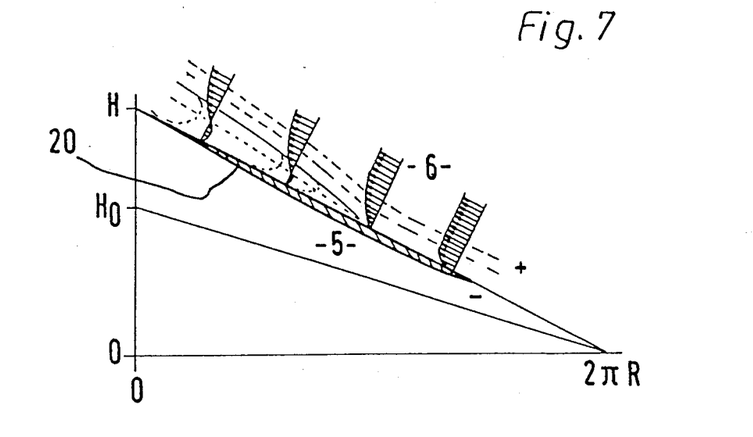
FIGS. 7 and 8 show the flow on a normal blade and on a spreading blade of a screw propeller.
Figure 8:
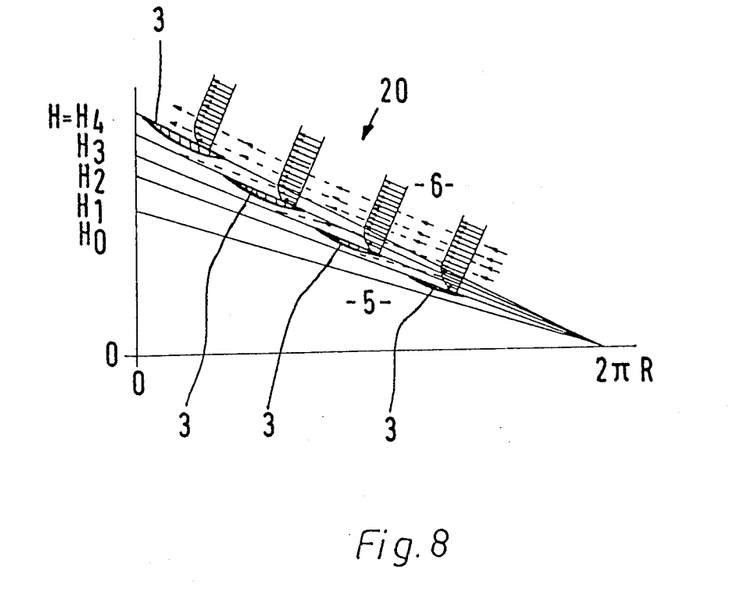
Figure 9:
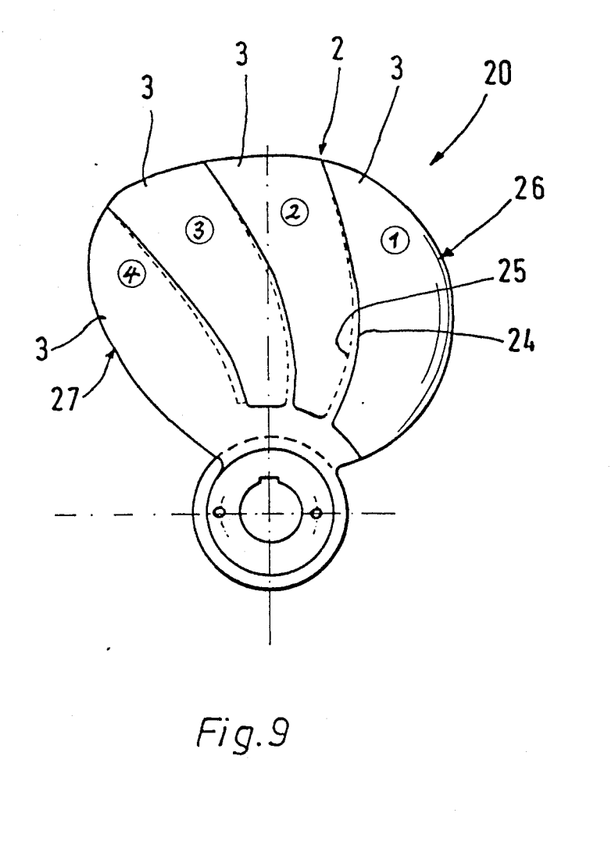
FIG. 9 shows a propeller blade of the screw propeller according to FIG. 6 in a diagrammatic side view.
Figure 10:
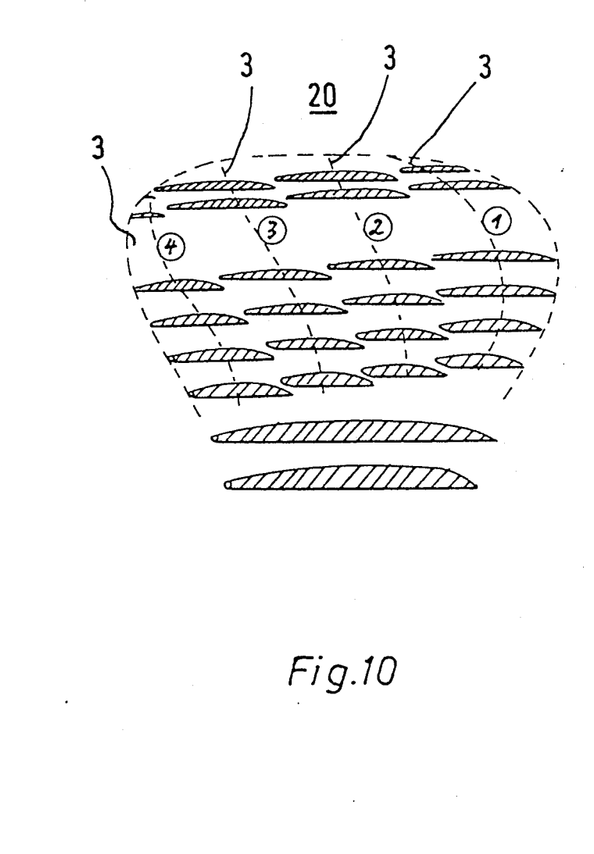
FIG. 10 shows the cross sections of the blade elements of the slotted blade of a propeller blade according to FIG. 9 in a diagrammatic view.

By forming slots 2 in individual propeller blades 20, it is possible to reduce the underpressure zones that occur on the trailing side with conventional propellers. Turbulences and the danger of the appearance of cavitation are reduced. FIG. 7 and FIG. 8 illustrate the difference of the course of the flow in a usual one-piece propeller blade 20 (FIG. 7) and in a further propeller blade 20 (FIG. 8) that is divided by slots into blade elements 3. While with propeller blade 20, that is like a spread blade, the velocity profile remains equal over the blade depth, with the normal profile there occurs, due to the formation of vortices, a partial reverse of the direction of flow so that the induced resistance is increased. It is thus possible to operate propeller 21 at a higher rotational speed than is possible with propellers of comparable size but without blade elements 3. By optimized transformation of the energy transmitted from the drive shaft to the propeller, due to concentration of the accelerated fluid mass coaxial to the propeller longitudinal axis 23, the efficiency of propeller 21 is considerably increased compared with known embodiments. Also contributing to this is the fact that the profile skeleton of a propeller blade 20 in the region of blade base 10 exhibits a maximum curvature, while the profile skeleton of blade element 3 at blade edge 4 is designed to be straight. FIG. 9 shows a propeller blade 20 in a side view and illustrates the curved design of blade elements 3 and slots 2. The overlapping of slot edges 24, 25 of neighboring blade elements 3 is indicated. FIG. 10 shows the vertical projection of the profile cross sections of blade elements 3 of propeller blade 20 according to FIG. 9.

The principle underlying propeller 21 of dividing each propeller blade 20, by slots, into separate blade elements 3 is, in view of its use, not limited to propellers. Such propellers can also be used in water turbines designed as propeller turbines and in steam or gas turbines.

Spreading slotted blades 19 with blade elements 3 in the form of blade groups 66 can also be used for other purposes in wind- and engine-driven marine vehicles, thus for example, as horizontal fins and/or trim fins and/or hydrofoils. In these cases, the maneuverability of the marine vehicle concerned is improved. It is also possible to place blade groups 66 on each side of a keel 61, for example, in sail yachts qualified for the open sea.

The keel of a sail yacht acts as ballast and has the effect of a vertical hydrofoil for the generation of a hydrodynamic side force. This partially compensates for the lateral forces coming from the sails. As ballast, the keel stabilizes the hull against the rolling moment of the forces acting on the sail. Usually, the ballast in yachts consists of lead and can make up between 70 and 80% of the total boat weight. As ballast, the keel has the task above all of establishing the yacht's center of gravity. The deeper this is, the more stable is the boat. As a hydrofoil a keel has a considerable influence on the four or five kinds of resistance that a moving hull encounters. Depending on the respective profiling it generates a streamline resistance by flow pressure due to turbulences. Further, the keel has quite a large wetted surface and is short along the flow direction so that it contributes disproportionately to frictional resistance. Thirdly, the volume of the keel, located only one to two meters beneath the surface of the water, multiplies the overall wave-generating resistance of the yacht. Fourthly, the keel shape considerably influences the size of the induced resistance which arises due to the side force. The induced resistance constitutes the greatest contribution of the keel to the total resistance and decreases when the span width of the buoyancy system is increased. An enlargement of the span width is possible only to a limited extent for various reasons. Thus it has already been suggested to provide the keel, in the region of the lower end section, with small laterally extending blades, whereby the blades are placed slanting downward at a certain angle to the horizontal. By such blades, the induced resistance of the keel is reduced. Further, in a keel designed with blades, on the keel another trim rudder is provided that can be operated from inside the boat.

FIGS. 11 to 17 show the arrangement of blades 62, 63 configured as slotted blade groups 66 on a keel 61.

Figure 11:
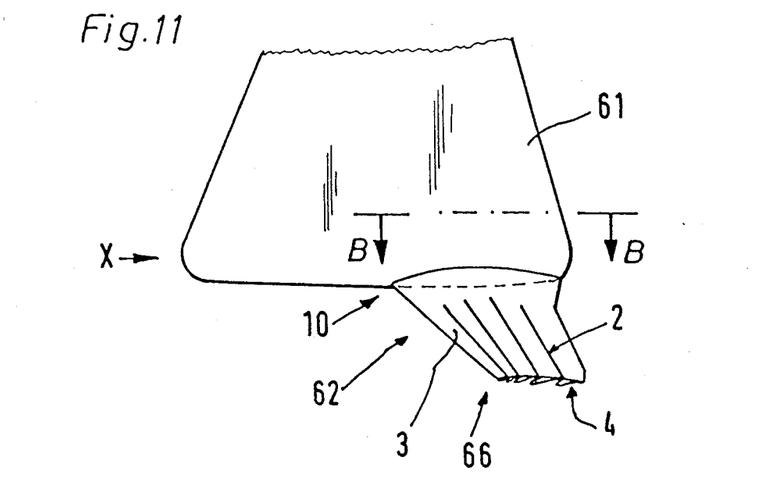
FIG. 11 shows a keel with a device according to the invention in side view.

Keel 61, shown diagrammatically in a side view in FIG. 11, can have a hydraulic shape that is adapted to the application of the yacht. On the underside of keel 61, in the region of its rear section, on both sides blades 62, 63 are placed on which blade elements 3 are formed by slots 2 that extend to blade edge 4.

Figure 12:
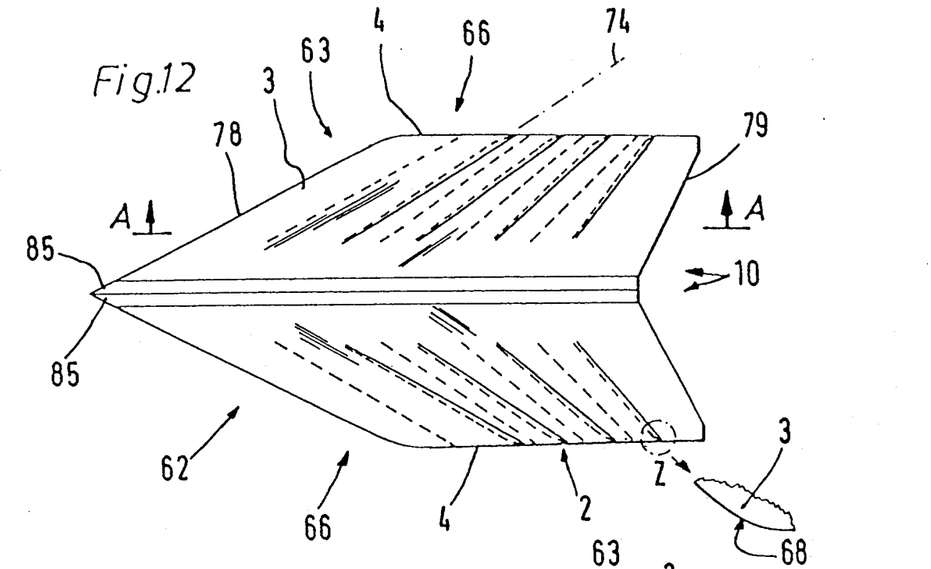
FIG. 12 shows a blade pair for a keel in a diagrammatic top view.
Figure 13:
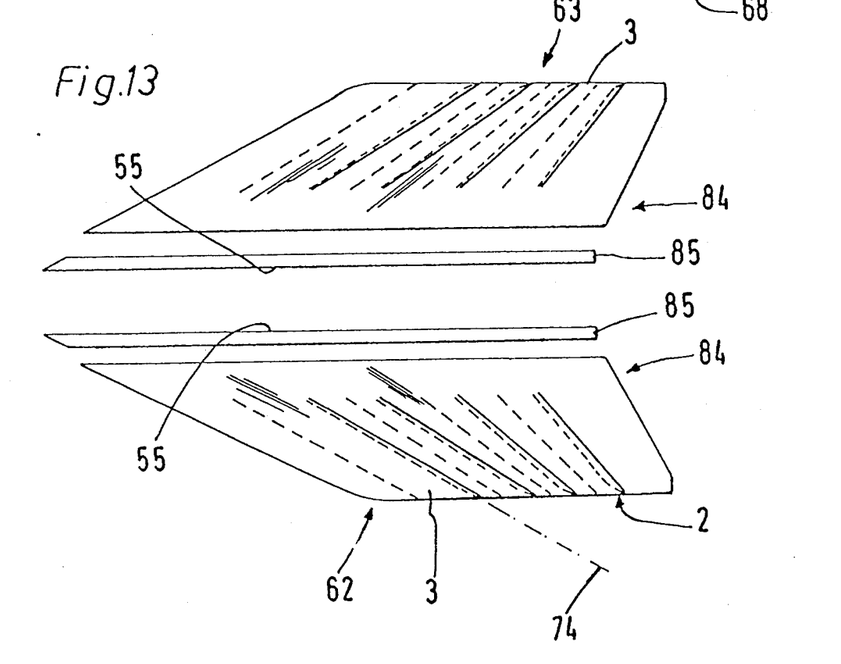
FIG. 13 is an exploded representation of the blade pair according to FIG. 12 in a top view.

FIGS. 12 and 13 show, in a top view, blades 62, 63 that are to be attached on both sides of a keel 61. Each blade 62, 63 forms a slotted blade group 66 that is formed by slots 2 that extend to blade edge 4. The longitudinal axes 74 of the slots are oriented straight, but at an oblique angle to the initial flow direction X. Leading edge 78 of first blade element 3 in initial flow direction X and trailing edge 79 of last blade element 3 in initial flow direction X are, likewise, oriented at oblique angles to initial flow direction X.

Blade base 10 of each blade 62, 63 consists of a one-piece base section 84 of each slotted blade group 66 and an adapter piece 85 that can be connected to base section 84. Adapter pieces 85 are matched to the profile of base sections 84 and can be connected in an interlocking manner to keel 61. With adapter pieces 85, it is possible to fasten slotted blade groups 66 of blades 62, 63 to keel 61 with a different profile. For this, it is necessary only to form the surfaces 55 of adapter pieces 85 that face keel 61 so that an interlocking connection to keel 61 can be achieved. Surfaces 55 can, as shown, be plane, but as a rule have a spatially profiled form determined by the profiling of keel 61.

Blade elements 3 are, in the region of blade edge 4, formed to be rounded on the leading side, as shown in the enlarged detail of drawing FIG. 12.

Figure 14:
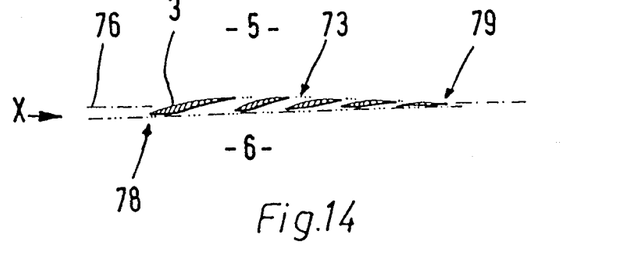
FIG. 14 is a view of the end edge of the keel blade of FIG. 13.
Figure 15:
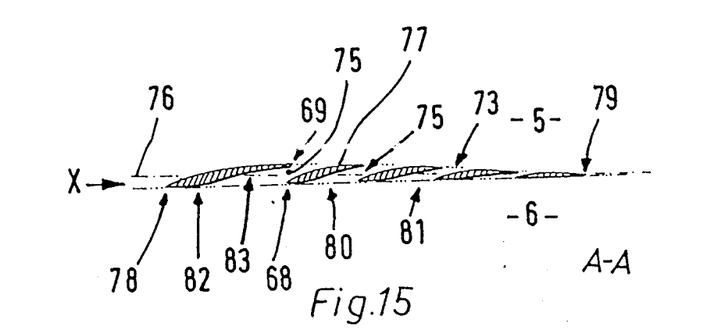
FIG. 15 shows the blade according to FIG. 13 in a crosswise sectional view taken along line A—A of FIG. 12.
Figure 16:
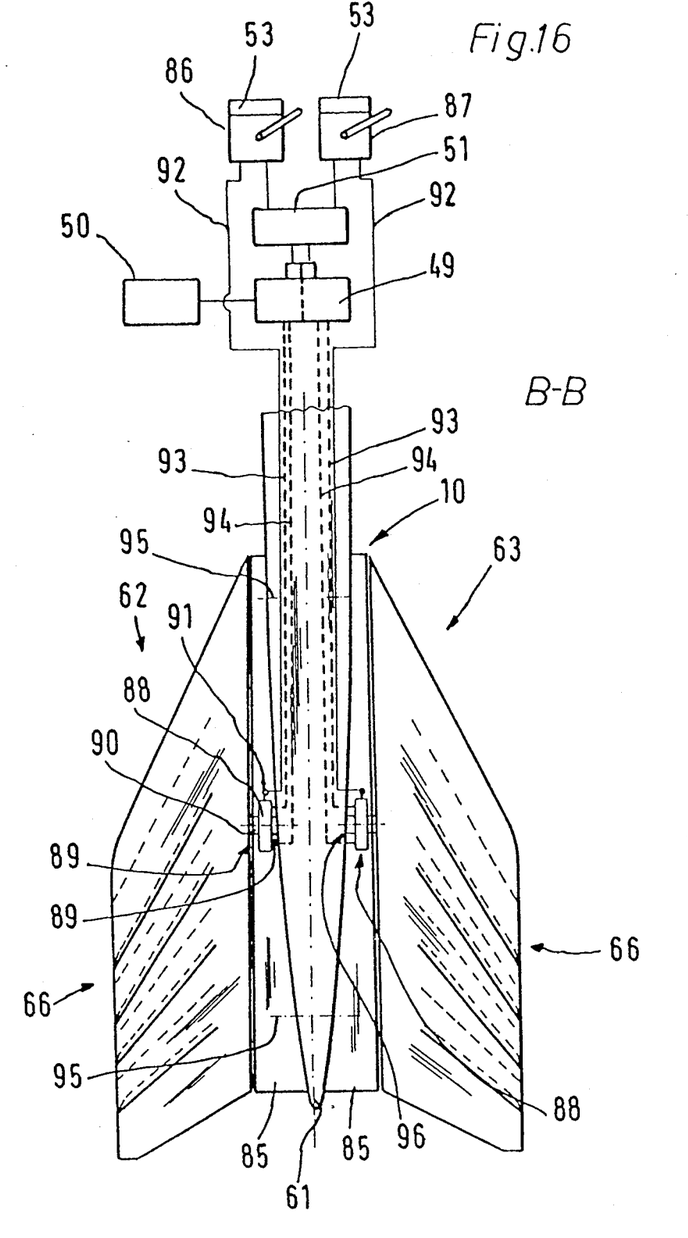
FIG. 16 is a diagrammatic view of the keel with blades, as viewed along line B—B of FIG. 11 and with a blade adjustment device.

As can be seen from FIGS. 14 and 15, on the overpressure side, leading edges 78, 68 of blade elements 3 that follow consecutively in initial flow direction X are placed horizontally offset to the trailing edges 69 on the underpressure side of blade elements 3 in initial flow direction X so that, in the region of each slot opening 81, leading edge 68 on the pressure side of one blade element 3 overlaps trailing edge 69 on the underpressure side of the other blade element 3. In the region of the end section 75 of the slot 2, on the underpressure side, trailing edges 69 have a sharp-edged configuration as described relative to FIGS. 4a and 4b. Slots 2 are formed to be nozzle-shaped and the continuous flow direction extends from pressure zone 6 to underpressure zone 5. Blade elements 3 are formed so that they are located inside a profile envelope 73 that is set by blade base 10 of each slotted blade group 66. This prevents an interruption of the flow in the region of pressure zone 6 or underpressure zone 5. Relative to underpressure zone 5, blade elements 3 can be differently inclined toward each other so that blades 62, 63 can be hydrodynamically optimized depending on their geometry. Further, profile envelope 73 exhibits an overall inclination to horizontal 76.

Surfaces 80 on the pressure side exhibit, adjacent to leading edges 78, 68, a surface section 82 that is convexly curved on which a surface section 83, that extends to respective trailing edge 69 and is concavely curved, borders continuously. By this configuration of the slot cross section, a part of the water flowing along the underside of blade 62, 63 is guided with reduced vortices to the upper side of blade 62, 63 and prevents here, by supplying energy, an early turbulence of the water flowing by the upper side of blade 62, 63. In principle, the cross-sectional configuration of blade element 3 of blades 62, 63 thus corresponds to that of blade elements 3 of spreading slotted blade 19 according to FIG. 4b.

The blade angle of blades 62, 63 can be adjusted simultaneously or independently of one another. Control units 86, 87 (FIG. 16) located onboard the ship and each allocated to one of blades 62, 63 serve this purpose. By control units 86, 87, the blade angle of blades 62, 63 can be adjusted depending on the operating condition of the yacht having keel 61. The adjustment of the blade angle can occur especially advantageously by hydraulic servomotor 88, whose position can be adjusted electrohydraulically by control units 86, 87. Servomotors 88 can, for example, be formed of rotary piston motors or as twin-chamber pivoting lever drives 97.

Figure 17A:
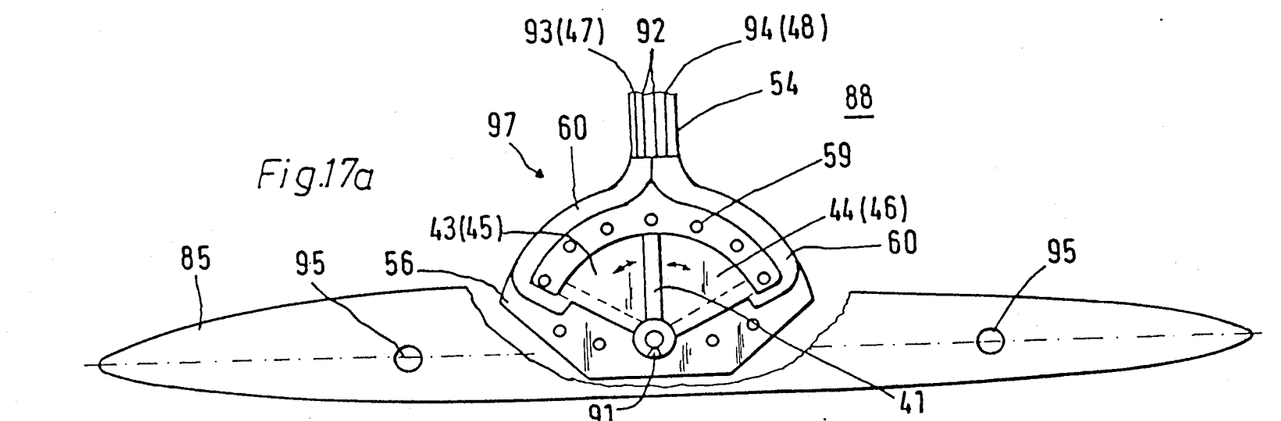
FIGS. 17a to 17c are, respectively, a side view, crosswise sectional view and top view.
Figures 17B, 17C:
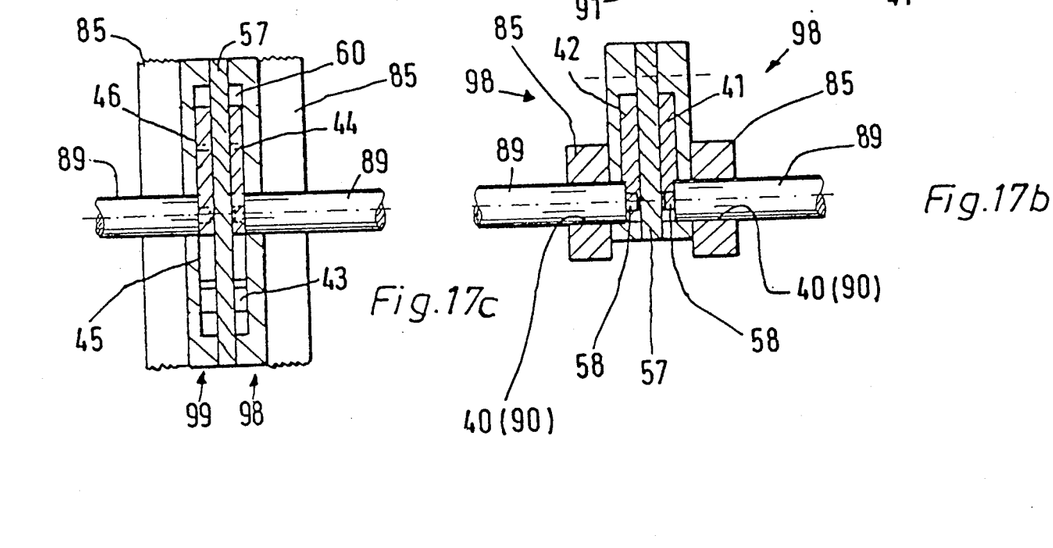

In the embodiment of a blade adjustment device shown in FIG. 17, in each adapter piece 85, there is provided, as servomotor 88, a hydraulically driven rotary piston motor whose position can be hydraulically adjusted by control units 86, 87. Each rotary piston internal combustion engine is connected by a pin 89 to slotted blade group 66 of the relevant blade 62, 63. On both sides of the rotary piston motor, pins 89 are supported by bearings 90. To prevent an axial shift of pins 89, each pin 89 is secured by a screw connection 96 in the region of adapter piece 85. The connection of adapter pieces 85 to keel 61 occurs by indicated screw connections 95.

Each rotary piston motor exhibits a position sensor 91 which is connected to a respective control unit 86, 87 by a measured value line 92. This makes it possible for the person operating control units 86, 87 to be able to constantly monitor and optionally correct the blade angle of blades 62, 63. The measured value lines 92 and compressed oil lines 93, 94 necessary for the operation of servomotors 88 are suitably run through keel 61 to the ship's hull. For this, an empty pipe 54 can be provided in keel 61. Control units 86, 87 act on an electromagnetic control unit 51 that is connected to a multipath valve 49. This is preferably placed on the end section of keel 61 that is on the hull side. By multipath valve 49, compressed oil is fed to the rotary piston motors from a compressed oil supply device 50 in a dosed and controlled manner.

FIG. 17a to 17c show a further embodiment of a hydraulic servomotor 88 that is configured as a twin-chamber pivoting lever drive 97. This twin-chamber pivoting lever drive 97 is double acting and can be placed in keel 61, whereby a drive part 98 is connected to pin 89 of one slotted blade group 66 and other drive part 99 is connected to pin 89 of the other slotted blade group 66. Pins 89 are run through openings 40, configured as bearings 90, in adapter pieces 85. For this it is advantageous to make adapter pieces 85 of bronze and pins 89 of special steel. In this case, bearings 90 can be configured as friction bearings. Each drive part 98, 99 exhibits two chambers 43, 44; 45, 46 which, by a compressed oil line 93, 94; 47, 48, are each connected to an electrohydraulic multipath valve 49. On each drive part 98, 99 a position sensor 91 is further provided that is connected by a measured value line 92 to the respective control unit 86, 87. Even when using a twin-chamber pivoting lever drive 97, compressed oil lines 93, 94; 47, 48 and measured value lines 92 can be run in an empty pipe 54 through keel 61. Electrohydraulic multipath valve 49 can be placed on the end section of keel 61 on the hull side and can be actuated by an electromagnetic control unit 51 that is connected to control units 86, 87, as already explained for FIG. 16.

Twin-chamber pivoting lever drive 97 consists of a housing 56 in which chambers 43, 44; 45, 46 are formed and pivoting levers 41, 42 are placed. Housing 56 is advantageously put directly in keel 61 and fastened by screws 59. On both sides of housing 56 an adapter piece 85 is placed and connected by screw connections 95 to keel 61. In the middle of housing 56 a partition 57 is placed by which chambers 43, 44; 45, 46 are formed. Ducts 60, on the edge, connect chambers 43, 44; 45, 46 to compressed oil lines 93, 94; 47, 48. Pins 58, which are connected to pins 89, are supported on both sides of partition 57. Pivoting levers 41, 42 are connected with resistance to torsion to respective pins 89 of slotted blade group 66. This configuration of twin-chamber pivoting lever drive 97 makes possible an especially compact structure with simultaneous transmission of large actuating powers and is thus especially suitable for adjustment of the blade angle of blades 62, 63.

The combination of hydrodynamically optimized slotted blade groups 66 on a keel 61 with the possibility of being able to adjust blades 62, 63 individually makes it possible to optimally adapt a yacht thus equipped to the prevailing water and wind conditions. Further, turns with extremely small radii are possible, which is especially advantageous in regattas.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. Blade-like profiled device for acting on a gaseous or liquid fluid flowing around it and having, as a means for improving efficiency, a slotted blade head having lamellar profiled blade elements between adjacent elements of which, to shift the flow separation zone, a slot is placed, said slot widening to a maximum width at an edge of the lamellar profiled blade elements, wherein each slot begins at a distance from a root of the blade-like device and runs radially outwardly; wherein said blade elements are placed relative to each other so that consecutive end edges thereof, in an initial flow direction, are offset relative to each other in a direction of a pressure zone side of the device; wherein at least a first of the blade elements in the initial flow direction protrudes in the plane of longitudinal axis of the blade in the initial flow direction; and wherein at least a middle blade element is oriented generally coaxially to the longitudinal axis of the blade and subsequent blade elements protrude in the direction of the pressure zone side.

2. Device according to claim 1, wherein blade elements that follow a first of the blade elements in said initial flow direction, relative to a respective longitudinal axis of a complete blade of which they are a part, are convexly curved so that radially oriented flow of the fluid is deflected on a trailing side in a flow that is oriented generally at a right angle to the radial flow.

3. Device according to claim 1, wherein the slots between the blade elements are of a nozzle-shaped configuration with a flow direction extending from the pressure zone side to an underpressure zone side.

4. Device according to claim 3, wherein the blade elements are mounted in a manner enabling them to be pivoted in a radial plane from an adjacent position wherein the blade elements are adjacent each other into a spread position wherein the blade elements are spaced at a distance from each other.

5. Device according to claim 4, wherein each blade element is individually shiftable by an electric or hydraulic actuator.

6. Device according to claim 5, wherein at least one blade element is rotatable about its longitudinal axis.

7. Device according to claim 1, wherein the blade elements are located within a profile envelope which is inclined relative to horizontal.

8. Device according to claim 1, wherein said device is a screw propeller, for ships or turboengines, having a plurality of said slotted blade heads attached to a propeller hub as propeller blades, wherein the blade elements of each propeller blade have approximately the same surfaces around which fluid flows and wherein said slots are of a convexly curved configuration in a propeller plane and extend approximately from a point near the propeller hub to tips of for propeller blades.

9. Device according to claim 8, wherein facing side edges of the blade elements bordering a respective slot are scarfed, generally parallel to each other and at an oblique angle to the propeller plane.

10. Device according to claim 9, wherein leading and trailing side edges of the propeller blade are scarfed at an oblique angle to the propeller plane.

11. Device according to claim 8, wherein the blade element of the propeller blade that is in front in the direction of rotation of the propeller is placed in a radially normal plane that is oriented toward the pressure zone at an oblique angle relative to a longitudinal axis of the propeller, and wherein subsequent blade elements protrude into the pressure zone and are placed offset to each other and to each front blade element.

12. Blade-like profiled device for acting on a gaseous or liquid fluid flowing around it and having, as a means for improving efficiency, a slotted blade head having lamellar profiled blade elements between adjacent elements of which, to shift the flow separation zone, a slot is placed, said slot widening to a maximum width at an edge of the lamellar profiled blade elements, wherein each slot begins at a distance from a root of the blade-like device and runs radially outwardly; wherein said blade elements are placed relative to each other so that consecutive end edges thereof, in an initial flow direction, are offset relative to each other in a direction of a pressure zone side of the device, wherein the blade elements are connected to a blade base and are integrated into its profile; and wherein the blade base and the blade elements are connected to a blade body by a coupling to form a complete blade of which the slotted blade head forms a part.

13. Device according to claim 12, wherein said coupling comprises a recess formed on an outer end section of the blade body, said recess formed and in which a section of the slotted blade head is inserted and connected by an adhesive to the blade body.

14. Device according to claim 12, wherein blade elements that follow a first of the blade elements in said initial flow direction, relative to a respective longitudinal axis of a complete blade of which they are a part are convexly curved so that radially oriented flow of the fluid is deflected on a trailing side in a flow that is oriented generally at a right angle to the radial flow.

15. Device according to claim 12, wherein the blade elements are located within a profile envelope which is inclined relative to horizontal.

16. Device according to claim 12, wherein said device is a screw propeller, for ships or turboengines, having a plurality of said slotted blade heads attached to a propeller hub as propeller blades; and wherein facing side edges of the blade elements bordering a respective slot are scarfed, generally parallel to each other and at an oblique angle to the propeller plane.

17. Device according to claim 16, wherein leading and trailing side edges of the propeller blade are scarfed at an oblique angle to the propeller plane.

18. Device according to claim 16, wherein the blade element of the propeller blade that is in front in the direction of rotation of the propeller is placed in a radially normal plane that is oriented toward the pressure zone at an oblique angle relative to a longitudinal axis of the propeller, and wherein subsequent blade elements protrude into the pressure zone and are placed offset to each other and to each front blade element.

19. Blade-like profiled device for acting on a gaseous or liquid fluid flowing around it and having, as a means for improving efficiency, a slotted blade head having lamellar profiled blade elements between adjacent elements of which, to shift the flow separation zone, a slot is placed, said slot widening to a maximum width at an edge of the lamellar profiled blade elements, wherein each slot begins at a distance from a root of the blade-like device and runs radially outwardly; wherein said blade elements are placed relative to each other so that consecutive end edges thereof, in an initial flow direction, are offset relative to each other in a direction of a pressure zone side of the device, wherein the blade elements are connected to a blade base and are integrated into its profile; and wherein, on each blade element, a pin is formed that is guided through the blade base and inserted into a blade body, said pin being connected to the slotted blade head and blade body by adhesives, and a laminate layer made of plastic, is applied about an area encompassing the connection of the blade base to the blade elements and of the slotted blade head to said blade body in a manner causing an outer surface of the laminate layer to conform to the profile of the blade elements, blade base and blade body in said area.

20. Device according to claim 19, wherein blade elements that follow a first of the blade elements in said initial flow direction, relative to a respective longitudinal axis of a complete blade of which they are a part are convexly curved so that radially oriented flow of the fluid is deflected on a trailing side in a flow that is oriented generally at a right angle to the radial flow.

21. Device according to claim 19, wherein the blade elements are located within a profile envelope which is inclined relative to horizontal.

22. Device according to claim 19, wherein said device is a screw propeller, for ships or turboengines, having a plurality of said slotted blade heads attached to a propeller hub as propeller blades; and wherein facing side edges of the blade elements bordering a respective slot are scarfed, generally parallel to each other and at an oblique angle to the propeller plane.

23. Device according to claim 22, wherein leading and trailing side edges of the propeller blade are scarfed at an oblique angle to the propeller plane.

24. Device according to claim 22, wherein the blade element of the propeller blade that is in front in the direction of rotation of the propeller is placed in a radially normal plane that is oriented toward the pressure zone at an oblique angle relative to a longitudinal axis of the propeller, and wherein subsequent blade elements protrude into the pressure zone and are placed offset to each other and to each front blade element.

25. Blade-like profiled device for acting on a gaseous or liquid fluid flowing around it and having, as a means for improving efficiency, a slotted blade head having lamellar profiled blade elements between adjacent elements of which, to shift the flow separation zone, a slot is placed, said slot widening to a maximum width at an edge of the lamellar profiled blade elements, wherein each slot begins at a distance from a root of the blade-like device and runs radially outwardly; wherein blade elements that follow a first of the blade elements in an initial flow direction, relative to a respective longitudinal axis of a complete blade of which they are a part, are convexly curved so that radially oriented flow of the fluid is deflected on a trailing side in a flow that is oriented generally at a right angle to the radial flow; and wherein at least a middle blade element is oriented generally coaxially to the longitudinal axis of the blade and subsequent blade elements protrude in a direction of a pressure zone side of the device.

26. Device according to claim 25, wherein the slots between the blade elements are of a nozzle-shaped configuration with a flow direction extending from the pressure zone side to an underpressure zone side.

27. Device according to claim 26, wherein the blade elements are mounted in a manner enabling them to be pivoted in a radial plane from an adjacent position wherein the blade elements are adjacent each other into a spread position wherein the blade elements are spaced at a distance from each other.

28. Device according to claim 27, wherein each blade element is individually shiftable by an electric or hydraulic actuator.

29. Device according to claim 28, wherein at least one blade element is rotatable about its longitudinal axis.

30. Device according to claim 25, wherein the blade elements are connected to a blade base and are integrated into its profile, the blade base and the blade elements being connected to a blade body by a coupling to form a complete blade of which the slotted blade head forms a part.

31. Device according to claim 30, wherein said coupling comprises a recess formed on an outer end section of the blade body, said recess formed and in which a section of the slotted blade head is inserted and connected by an adhesive to the blade body.

32. Device according to claim 30, wherein, on each blade element, a pin is formed that is guided through the blade base and inserted into a blade body, said pin being connected to the slotted blade head and blade body by adhesives, and a laminate layer made of plastic, is applied about an area encompassing the connection of the blade base to the blade elements and of the slotted blade head to said blade body in a manner causing an outer surface of the laminate layer to conform to the profile of the blade elements, blade base and blade body in said area.

33. Device according to claim 25, wherein the blade elements are located within a profile envelope that is set by a blade base of the slotted blade, wherein said profile envelope is inclined relative to horizontal.

34. Blade-like profiled device for acting on a gaseous or liquid fluid flowing around it and having, as a means for improving efficiency, a slotted blade head having lamellar profiled blade elements between adjacent elements of which, to shift the flow separation zone, a slot is placed, said slot widening to a maximum width at an edge of the lamellar profiled blade elements, wherein each slot begins at a distance from a root of the blade-like device and runs radially outwardly; wherein blade elements that follow a first of the blade elements in said initial flow direction, relative to a respective longitudinal axis of a complete blade of which they are a part are convexly curved so that radially oriented flow of the fluid is deflected on a trailing side in a flow that is oriented generally at a right angle to the radial flow; and wherein said device is a screw propeller, for ships or turboengines, having a plurality of said blade heads attached to a propeller hub as propeller blades, wherein facing side edges of the blade elements bordering a respective slot are scarfed, generally parallel to each other and at an oblique angle to the propeller plane.

35. Device according to claim 34, wherein leading and trailing side edges of the propeller blade are scarfed at an oblique angle to the propeller plane.

36. Device according to claim 34, wherein the blade element of the propeller blade that is in front in the direction of rotation of the propeller is placed in a radially normal plane that is oriented toward the pressure zone at an oblique angle relative to a longitudinal axis of the propeller, and wherein subsequent blade elements protrude into the pressure zone are placed offset to each other and to each front blade element.

* * * * *